US012393863B2

(12) United States Patent
Dong et al.

(10) Patent No.: US 12,393,863 B2
(45) Date of Patent: Aug. 19, 2025

(54) DISTRIBUTED TRAINING METHOD AND SYSTEM, DEVICE AND STORAGE MEDIUM

(71) Applicant: Beijing Baidu Netcom Science and Technology Co., Ltd., Beijing (CN)

(72) Inventors: Daxiang Dong, Beijing (CN); Weibao Gong, Beijing (CN); Yi Liu, Beijing (CN); Dianhai Yu, Beijing (CN); Yanjun Ma, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1081 days.

(21) Appl. No.: 17/142,822

(22) Filed: Jan. 6, 2021

(65) Prior Publication Data

US 2021/0406767 A1    Dec. 30, 2021

(30) Foreign Application Priority Data

Jun. 28, 2020    (CN) .......................... 202010599075.1

(51) Int. Cl.
*G06N 20/00*    (2019.01)
*G06F 16/182*    (2019.01)
*G06N 5/04*    (2023.01)

(52) U.S. Cl.
CPC ........... *G06N 20/00* (2019.01); *G06F 16/182* (2019.01); *G06N 5/04* (2013.01)

(58) Field of Classification Search
CPC   G06N 20/00; G06N 5/04; G06N 3/08; G06N 3/098; G06N 3/045; G06F 16/182; G06F 9/485; G06F 9/5027; H04L 41/16
See application file for complete search history.

(56) References Cited

U.S. PATENT DOCUMENTS

2016/0004610 A1* 1/2016 Knight ................ G06F 11/2028
                                                        714/4.11
2018/0300171 A1* 10/2018 Qiao ..................... G06F 9/5088
(Continued)

FOREIGN PATENT DOCUMENTS

CN           105760240           7/2016
CN           105956021           9/2016
(Continued)

OTHER PUBLICATIONS

Japanese Notice of Reasons for Refusal JP 2020-192957 (Jan. 20, 2022) (6 pages).
(Continued)

*Primary Examiner* — Abdullah Al Kawsar
*Assistant Examiner* — Gisel Gabriela Faccenda
(74) *Attorney, Agent, or Firm* — NORTON ROSE FULBRIGHT US LLP

(57) ABSTRACT

The present application discloses a distributed training method and system, a device and a storage medium, and relates to technical fields of deep learning and cloud computing. The method includes: sending, by a task information server, a first training request and information of an available first computing server to at least a first data server; sending, by the first data server, a first batch of training data to the first computing server, according to the first training request; performing, by the first computing server, model training according to the first batch of training data, sending model parameters to the first data server so as to be stored after the training is completed, and sending identification information of the first batch of training data to the task information server so as to be recorded; wherein the model parameters are not stored at any one of the computing servers.

7 Claims, 2 Drawing Sheets

(56) References Cited

U.S. PATENT DOCUMENTS

| | | | | |
|---|---|---|---|---|
| 2018/0322415 | A1* | 11/2018 | Bendre | G06N 20/00 |
| 2018/0331897 | A1* | 11/2018 | Zhang | G06N 20/00 |
| 2019/0286526 | A1* | 9/2019 | Walters | G06F 11/1451 |
| 2020/0111030 | A1 | 4/2020 | Starosta et al. | |
| 2020/0174840 | A1 | 6/2020 | Zhao et al. | |

FOREIGN PATENT DOCUMENTS

| | | |
|---|---|---|
| CN | 106022521 | 10/2016 |
| CN | 106169094 | 11/2016 |
| CN | 106529673 | 3/2017 |
| CN | 106529682 | 3/2017 |
| CN | 106708624 | 5/2017 |
| CN | 107578094 | 1/2018 |
| CN | 107733977 | 2/2018 |
| CN | 107885762 | 4/2018 |
| CN | 108681777 | 10/2018 |
| CN | 108763299 | 11/2018 |
| CN | 108880928 | 11/2018 |
| CN | 108934293 | 12/2018 |
| CN | 109062700 | 12/2018 |
| CN | 109102075 | 12/2018 |
| CN | 109815002 | 5/2019 |
| CN | 110033095 | 7/2019 |
| CN | 110221913 | 9/2019 |
| CN | 110457176 | 11/2019 |
| CN | 110619388 | 12/2019 |
| CN | 110704630 | 1/2020 |
| CN | 110850956 | 2/2020 |
| CN | 110928689 | 3/2020 |
| CN | 111027708 | 4/2020 |
| CN | 111030861 | 4/2020 |
| CN | 111079921 | 4/2020 |
| CN | 111079942 | 4/2020 |
| CN | 111126604 | 5/2020 |
| CN | 111131080 | 5/2020 |
| CN | 111147541 | 5/2020 |
| CN | 111160531 | 5/2020 |
| CN | 111221646 | 6/2020 |
| CN | 111240901 | 6/2020 |
| CN | 111259917 | 6/2020 |
| EP | 3399426 | 11/2018 |
| EP | 3678068 | 7/2020 |
| JP | 2012-022558 | 2/2012 |
| JP | 2020-513615 | 5/2020 |
| KR | 20190132475 B1 | 11/2019 |
| WO | WO 2019/042200 | 3/2019 |

OTHER PUBLICATIONS

Chinese Search Report CN 202010599075.1 (Apr. 28, 2021) (6 pages).

Notification of the Second Office Action CN 202010599075.1 (May 7, 2021) (20 pages).

Chinese Search Report CN 202010599075.1 (Jul. 28, 2021) (9 pages).

Extended European Search Report EP 21150081.4 (Jun. 8, 2021) (45 pages).

Peng, Y., et al. (2018) "*Optimus: An Efficient Dynamic Resource Scheduler for Deep Learning Clusters,*" Proceedings of the Thirteenth EuroSys Conferences; pp. 1-14.

Wang, N. (2013) "*The Dynamic Scheduling and Management of Computing Resource in Cloud Platform Based on OpenStack,*" Chinese Doctoral Dissertations & Master's Theses Full-text Databases (Doctoral), Information Technology Series No. 9; pp. 1137-1140.

Zhang, X. (2019) "*Research on Key Problems of Recurrent Neural Network Models,*" Chinese Doctoral Dissertations & Master's Theses Full-text Databases (Doctoral), Information Technology Series No. 2; pp. 1138-1142.

Zhao, X., et al. (2019) "*Dynamic Stale Synchronous Parallel Distributed Training for Deep Learning,*" 2019 IEEE 39th International Conference on Distributed Computing Systems (ICDCS); pp. 1507-1517.

Notification of the First Office Action CN 202010599075.1 (Jan. 28, 2021) (9 pages).

Chinese Search Report CN 202010599075.1 (Jan. 22, 2021) (7 pages).

Office Action issued in corresponding Korean Application No. 10-2020-0164799 dated May 16, 2024 (English Translation provided).

Office Action issued in corresponding European Application No. 21150081.4, dated Jun. 25, 2024.

\* cited by examiner

DISTRIBUTED TRAINING METHOD AND SYSTEM, DEVICE AND STORAGE MEDIUM

CROSS-REFERENCE TO RELATED APPLICATION

This application claims priority to Chinese patent application No. 202010599075.1, filed on Jun. 28, 2020, which is hereby incorporated by reference in its entirety.

TECHNICAL FIELD

The present application relates to the technical field of artificial intelligence, and in particular to technical fields of deep learning and cloud computing, and more particularly, to a distributed training method and system, a device and a storage medium.

BACKGROUND

Generally, in a big data scenario, the training of a deep learning model may adopt a distributed training manner to increase a training speed. Most existing deep learning frameworks use fixed cluster resources for parallel training until the model converges.

SUMMARY

The present application provides a distributed training method and system, a device and a storage medium.

According to a first aspect of the present application, there is provided a distributed training method based on a distributed training system, wherein the distributed training system is configured to perform model training according to training data, and the distributed training system includes: a task information server, data servers, and one or more computing servers, wherein the number of the data servers is more than one, and the number of the computing servers is variable; the distributed training method includes: sending, by the task information server, a first training request and information of an available first computing server to at least a first data server among a plurality of data servers; sending, by the first data server, a first batch of training data to the first computing server, according to the first training request; performing, by the first computing server, model training according to the first batch of training data, sending model parameters to the first data server so as to be stored after the training is completed, and sending identification information of the first batch of training data to the task information server so as to be recorded; wherein the model parameters are not stored at any one of the computing servers.

According to a second aspect of the present application, there is provided a distributed training system, including: a task information server, data servers, and one or more computing servers, wherein the number of the data servers is more than one, the number of the computing servers is variable, and the distributed training system is configured to perform model training according to training data; wherein the task information server is configured to send a training request and information of available computing servers to each of the data servers; the data servers are configured to send training data to available computing servers according to the received training request; the computing servers are configured to perform model training according to the received training data, send model parameters to the data servers so as to be stored after the training is completed, and send identification information of the training data after the training is completed to the task information server so as to be recorded; and wherein the model parameters are not stored at any one of the computing servers.

According to a third aspect of the present application, there is provided an electronic device, including:
at least one processor; and
a memory communicatively connected to the at least one processor; wherein
the memory stores instructions executable by the at least one processor, and the instructions are executed by the at least one processor to enable the at least one processor to perform the aforementioned distributed training method.

According to a fourth aspect of the present application, there is provided a non-transitory computer-readable storage medium which stores computer instructions, wherein the computer instructions enable a computer to perform the aforementioned distributed training method.

It should be understood that the content described in this section is not intended to identify the key or important features of the embodiments of the present application, or to limit the scope of the present application. Other features of the present application will be easily understood through the following description.

BRIEF DESCRIPTION OF THE DRAWINGS

The drawings are used to better understand the solutions and do not constitute a limitation to the present application, wherein.

DETAILED DESCRIPTION

The exemplary embodiments of the present application will be described below in combination with the drawings, including various details of the embodiments of the present application to facilitate understanding, which should be considered as only exemplary. Therefore, those of ordinary skill in the art should realize that various changes and modifications can be made to the embodiments described herein without departing from the scope and spirit of the present application. Likewise, descriptions of well-known functions and structures are omitted in the following description for clarity and conciseness.

In a cloud training scenario, a quota of training resources usually changes dynamically due to scheduling of the overall cluster, and conventional deep learning frameworks cannot be trained normally under a condition of dynamic computing resources, thereby affecting a training efficiency.

Figure 1:
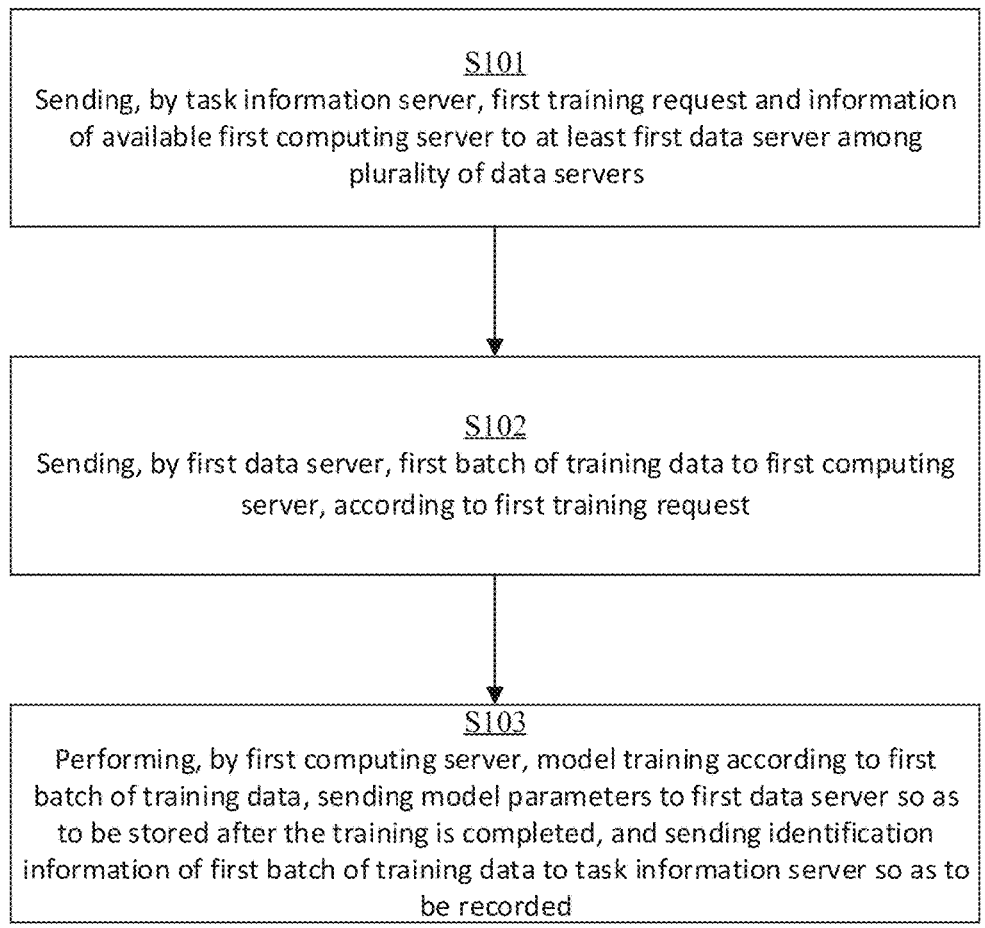
FIG. 1 shows a flow block diagram of a distributed training method according to an embodiment of the present application.

FIG. 1 shows a flow block diagram of a distributed training method according to an embodiment of the present application. The method is based on a distributed training system configured to perform model training according to training data. The distributed training system includes: a task information server, data servers, and one or more computing servers, wherein the number of the data servers is more than one, and the number of the computing servers is variable; the distributed training method includes:

S101: sending, by the task information server, a first training request and information of an available first computing server to at least a first data server among a plurality of data servers;

S102: sending, by the first data server, a first batch of training data to the first computing server, according to the first training request;

S103: performing, by the first computing server, model training according to the first batch of training data, sending model parameters to the first data server so as to be stored after the training is completed, and sending identification information of the first batch of training data to the task information server so as to be recorded; wherein the model parameters are not stored at any one of the computing servers.

According to the embodiment of the present application, the task information server sends, to the data server, the training request and the information of available computing servers, such as an Internet Protocol IP address and/or port information of available computing servers. The data servers send the training data to the computing servers, and the computing servers complete the training procedure. In addition, each of the computing servers does not store the model parameters, but sends the model parameters to the data servers so as to be stored, so that computing nodes are as lightweight as possible, and the overall system is less affected when the system is exited or joined. In addition, the model parameters are not stored at any one of the computing servers, so that fewer resources are occupied, and the computing resources can be used for model training, so as to improve the computing power of the computing resources. In addition, the computing servers further send the identification information of the training data to the task information server so as to be recorded, that is, the task information server records the training progress, so that training tasks can be configured to each of the computing nodes in the system to realize an overall efficient operation of the distributed training system.

By reasonably designing respective processing by the task information server, the data servers and the computing servers and a cooperation mode therebetween, the distributed training method according to the embodiment of the present application can realize a rapid adjustment of the computing nodes in the distributed training procedure, so that the computing power of the system is concentrated in the model training to improve an overall training efficiency of the system.

Figure 2:
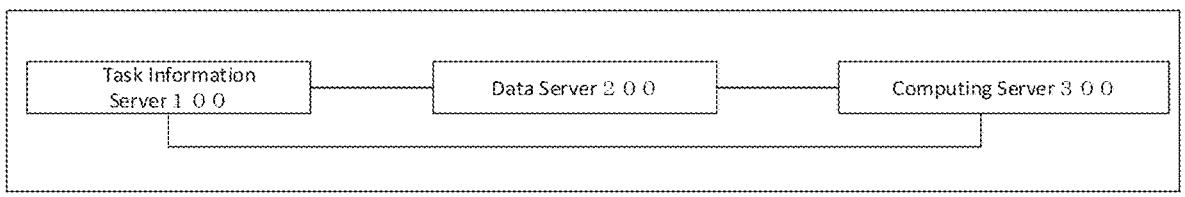
FIG. 2 shows a structural block diagram of a distributed training system according to an embodiment of the present application.

FIG. 2 shows a structural block diagram of a distributed training system according to an embodiment of the present application. The distributed training system includes a task information server 100, data servers 200, and one or more computing servers 300, wherein the number of the data servers 200 is more than one, and the number of the computing servers 300 is variable. The distributed training system is configured to perform model training according to training data.

The task information server 100 is configured to send a training request and information of available computing servers 300 to each of the data servers 200;

The data servers 200 are configured to send training data to available computing servers 300 according to the received training request;

The computing servers 300 are configured to perform model training according to the received training data, send model parameters to the data servers 200 so as to be stored after the training is completed, and send identification information of the training data after the training is completed to the task information server 100 so as to be recorded; wherein the model parameters are not stored at any one of the computing servers 300.

In the distributed training system according to the embodiment of the present application, respective functions of the task information server, the data servers and the computing servers are reasonably set, and cooperation modes therebetween are reasonably designed, which can realize timely and rapid adjustment of the computing nodes in the distributed training procedure, so that the computing power of the system tends to be optimal.

Figure 3:
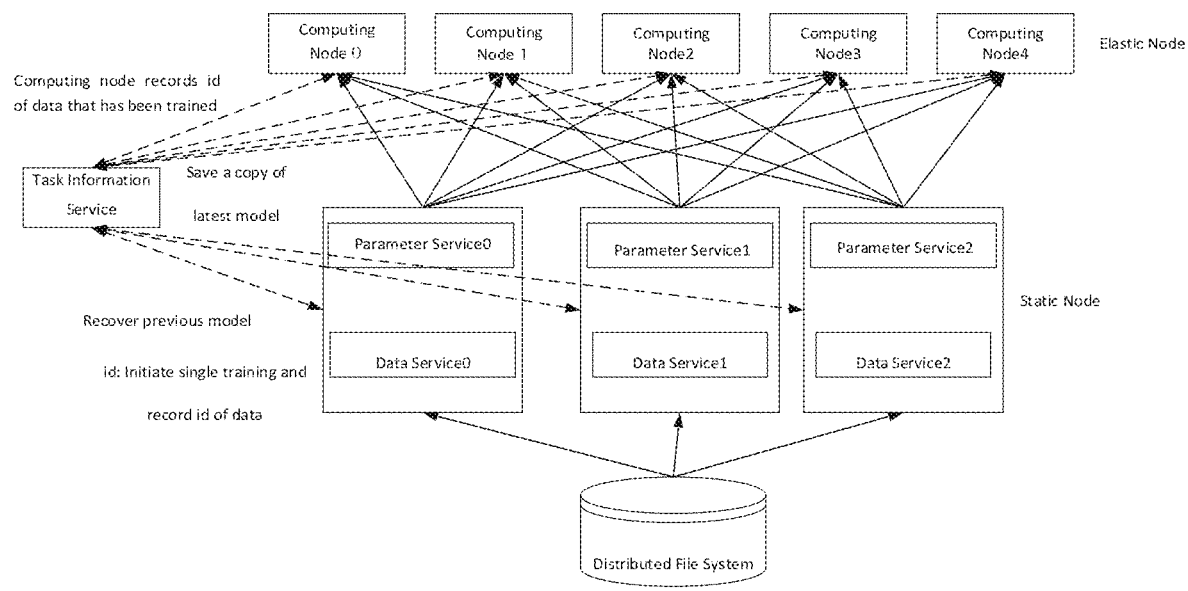
FIG. 3 shows an architecture diagram of a distributed training system according to another embodiment of the present application.

FIG. 3 shows an architecture diagram of a distributed training system according to another embodiment of the present application. FIG. 3 schematically depicts a logical connection relationship between the task information server, the data server, and the computing server. FIG. 3 shows 3 static nodes, each of which includes a data service and a parameter service. FIG. 3 further shows 4 elastic nodes corresponding to the computing nodes (i.e., computing servers).

Various implementations of the embodiments of the present application will be described in detail below with reference to the drawings.

In the embodiment of the present application, before the system starts training, each of the data servers downloads training data and information of a model to be trained from a distributed file system.

The advantage of this processing is that the computing servers are not required to save the training data, since the data servers download and save the training data and the information of the model to be trained. Instead, the computing servers only receive data required for training from the data servers to perform training, and return the model parameters to the data servers so as to be stored after the training is completed. It not only keeps the update of the model parameters, but also reduces the influence on the system when the computing nodes exit/join.

In the embodiment of the present application, each of the data servers includes a parameter server. The method further includes: storing the trained model parameters in a first parameter server in the first data server, after the first computing server sends the trained model parameters to the first data server.

In other words, the trained model parameters are stored in the parameter servers, and the data servers are responsible for sending training data and recovering a training result, so the processing is efficient.

In the embodiment of the present application, the task information server performs a survival detection on each of the computing servers in the system, and if the number of available computing servers in the system remains unchanged, enables the parameter server in each of the data servers to save a latest model parameters.

By means of the survival detection by the task information server, the number of available nodes in the system can be detected and updated, and it can also be determined whether the current model parameters of the system are valid for all of the computing nodes in the survival detection. If the number of nodes does not change, it means that the system can continue the training stably. At this time, the current latest model parameters are saved in the parameter servers, so as to provide a fallback basis for the subsequent system node change.

In the embodiment of the present application, the task information server performs a survival detection on each of the computing servers in the system, and if the number of available computing servers in the system changes, updates a list of available computing servers and enables the parameter server in each of the data servers to reload the model parameters of the last survival detection.

By means of the survival detection by the task information server, if the number of nodes changes, the system data information before the survival detection is invalid. At this time, the parameter server in each of the data servers is reloaded with the model parameters of the last survival detection, i.e., returns to the data version of the last survival detection to ensure that the training procedure is correct.

In the embodiment of the present application, when the task information server performs the survival detection, the system suspends the training. After the survival detection is completed, the task information server sends a new training request to each of the data servers according to the current model parameters and identification information of the recorded training data that has completed the training.

When the task information server performs the survival detection, the training is suspended, and a new training task is continued after the model parameters are updated, so as to ensure a stable and fast training procedure.

In the embodiment of the present application, there is no information interaction among the computing servers, and each of the computing nodes acquires training data from the parameter servers, thereby the computing resources are used for the model training to the largest extent.

In the embodiment of the present application, the task information server is a static node.

The task information server is responsible for a timing survival detection of the computing nodes in the system and maintaining a list of available computing servers, and capable of keeping the model parameters in the parameter server valid, so it is a central node of the distributed system and should be a static node. It should be understood that the task information server is located on a computing node that cannot be terminated or killed, so that the task information server is highly available to ensure stability of the system.

The flexible distributed training method according to the embodiment of the application may be used in the training and learning procedures of various machine learning models. For example, regarding a neural network deep learning framework, the above method can perform efficient training in the cloud where the resources changes flexibly, thereby ensuring the lightweight of the computing servers and the ability of quick and dynamic adjustment, which has important application significance and value.

The specific settings and implementations of the embodiments of the present application are described above from different perspectives through a plurality of embodiments. The flexibly distributed training method in the embodiments of the present application is based on the aforementioned distributed system, and the processing procedure of the method can refer to corresponding description in the aforementioned embodiments, which will not be repeated here.

Figure 4:
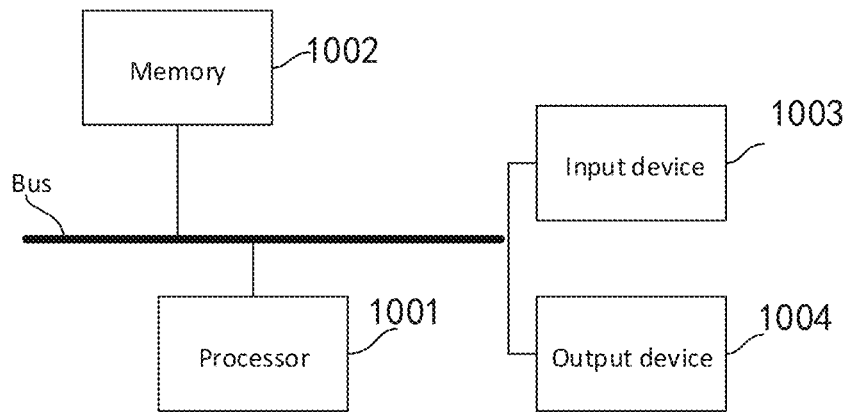
FIG. 4 shows a block diagram of an electronic device for implementing a flexible distributed training method according to an embodiment of the present application.

According to the embodiments of the present application, the present application further provides an electronic device and a readable storage medium. FIG. 4 is a block diagram of an electronic device for an flexibly distributed training method according to an embodiment of the present application. The electronic device is intended to represent various forms of digital computers, such as a laptop computer, a desktop computer, a workstation, a personal digital assistant, a server, a blade server, a mainframe computer, and other appropriate computers. The electronic device may also represent various forms of mobile apparatuses, such as a personal digital assistant, a cellular phone, an intelligent phone, a wearable device, and other similar computing apparatuses. The components shown herein, the connections and relationships therebetween, and the functions thereof are merely examples, and are not intended to limit the implementations of the present application described and/or required herein.

As shown in FIG. 4, the electronic device includes one or more processors 1001, a memory 1002, and interfaces for connecting various components, including a high-speed interface and a low-speed interface. The various components are connected to each other using different buses, and may be installed on a common motherboard or in other ways as required. The processor may process instructions executed in the electronic device, including those stored in or on the memory to display graphical information of a Graphical User Interface (GUI) on external input/output device (e.g., a display device coupled to an interface). In other embodiments, if necessary, a plurality of processors and/or a plurality of buses may be used together with a plurality of memories. Similarly, a plurality of electronic devices may be connected, each providing some necessary operations (e.g., serving as a server array, a group of blade servers, or a multi-processor system). One processor 1001 is taken as an example in FIG. 4.

The memory 1002 is a non-transitory computer-readable storage medium provided by the present application, wherein the memory stores instructions executable by at least one processor, so that the at least one processor performs the flexibly distributed training method provided by the present application. The non-transitory computer-readable storage medium of the present application stores computer instructions enabling a computer to perform the flexibly distributed training method provided by the present application.

As a non-transitory computer-readable storage medium, the memory 1002 may be configured to store non-transitory software programs, non-transitory computer-executable programs, and modules, such as program instructions/modules corresponding to the flexibly distributed training method in the embodiments of the present application. The processor 1001 executes various functional applications and data processing of the server by running the non-transient software programs, instructions, and modules stored in the memory 1002, thereby implementing the flexibly distributed training method in the above method embodiments.

The memory 1002 may include a program storage area and a data storage area, wherein the program storage area may store an operating system and an application program required by at least one function, and the data storage area may store data created according to the use of the electronic device for analyzing and processing the search result. In addition, the memory 1002 may include a high-speed random access memory, and a non-transitory memory such as at least one magnetic disk storage device, a flash memory device, or other non-transitory solid-state storage device. In some embodiments, the memory 1002 may optionally include memories remotely provided with respect to the processor 1001, and these remote memories may be connected to the electronic device for analyzing and processing the search result through a network. Examples of the network include, but are not limited to, the Internet, an intranet, a local area network, a mobile communication network, and combinations thereof.

The electronic device corresponding to the flexibly distributed training method may further include: input device 1003 and output device 1004. The processor 1001, the memory 1002, the input device 1003, and the output device 1004 may be connected by a bus or in other ways. The connection by a bus is taken as an example in FIG. 4.

The input device 1003 may receive input digital or character information, and generate key signal input related to user settings and function control of the electronic device for analyzing and processing the search result, and for example may be a touch screen, a keypad, a mouse, a track pad, a touch pad, an indicator stick, one or more mouse buttons, a trackball, a joystick, etc. The output device 1004 may include a display device, an auxiliary lighting means (e.g., an LED), tactile feedback means (e.g., a vibration motor), etc. The display device may include, but is not limited to, a liquid crystal display (LCD), a light emitting diode (LED) display, and a plasma display. In some embodiments, the display device may be a touch screen.

Various embodiments of the system and technology described here may be implemented in a digital electronic circuit system, an integrated circuit system, an application specific integrated circuit (ASIC), computer hardware, firmware, software, and/or combinations thereof. These embodiments may be implemented in one or more computer programs which may be executed and/or interpreted on a programmable system including at least one programmable processor. The programmable processor may be a dedicated or general programmable processor, which can receive and transmit data and instructions from and to a storage system, at least one input device and at least one output device.

These computer programs (also called as programs, software, software applications, or codes) include machine instructions of the programmable processor, and may be implemented using high-level procedures and/or object-oriented programming languages, and/or assembly/machine languages. As used herein, the terms 'machine-readable medium' and 'computer-readable medium' refer to any computer program product, device, and/or means (e.g., a magnetic disk, an optical disk, a memory, the programmable logic device (PLD)) configured to provide machine instructions and/or data to a programmable processor, including a machine-readable medium that receives machine instructions as machine-readable signals. The term 'machine-readable signal' refers to any signal configured to provide machine instructions and/or data to the programmable processor.

In order to provide an interaction with the user, the system and technology described here may be implemented on a computer that has display means for displaying information to the user (e.g., a cathode ray tube (CRT) or a liquid crystal display (LCD) monitor), and a keyboard and pointing means (e.g., a mouse or a trackball) through which the user can provide an input to the computer. Other types of means may also be used to provide an interaction with the user. For example, a feedback provided to the user may be any form of sensory feedback (e.g., a visual feedback, an auditory feedback, or a tactile feedback); and the input from the user may be received in any form (including an acoustic input, a voice input, or a tactile input).

The system and technology described here may be implemented in a computing system which includes a back-end component (e.g., a data server), or a middleware component (e.g., an application server), or a front-end component (e.g., a user computer with a graphical user interface or a web browser, through which the user can interact with the embodiment of the system and technology described here), or any combination of the background component, the middleware component, and the front-end component. The components of the system may be connected to each other by a digital data communication of any form or medium (e.g., a communication network). Examples of the communication network include a local area network (LAN), a wide area network (WAN), the Internet and a block chain network.

The computer system may include a client and a server. The client and the server are generally far away from each other and usually interact with each other through a communication network. A relationship between the client and the server is generated by computer programs which run on corresponding computers and have a client-server relationship with each other.

It should be understood that the various forms of the flows shown above can be used to reorder, add or delete steps. For example, the steps described in the present application may be executed in parallel, sequentially, or in a different order, as long as the desired result of the technical solution disclosed in the present application can be achieved, which is not limited herein.

The aforementioned specific embodiments do not constitute limitations to the protection scope of the present application. Those skilled in the art should understand that various modifications, combinations, sub-combinations and substitutions can be made according to design requirements and other factors. Any modification, equivalent substitution, improvement, etc. made within the spirit and principle of the present application should be covered by the protection scope of the present application.

The invention claimed is:

1. A distributed training method based on a distributed training system, wherein
    the distributed training system is configured to perform model training according to training data, and the distributed training system comprises: a task information server, data servers, and one or more computing servers, wherein the number of the data servers is more than one, and the number of the computing servers is variable;
    the distributed training method comprises:
    sending, by the task information server, a first training request and information of an available first computing server to at least a first data server among a plurality of data servers;
    sending, by the first data server, a first batch of training data to the first computing server, according to the first training request;
    performing, by the first computing server, model training according to the first batch of training data, sending model parameters to the first data server so as to be stored as the trained model parameters after the training is completed, and sending identification information of the first batch of training data to the task information server so as to be recorded;
    recording, by the task information server, a training progress, so as to configure training tasks to each of the computing servers in the system;
    wherein each of the data servers comprises a parameter server; and
    after the first computing server sends the trained model parameters to the first data server, the method further comprises: storing the trained model parameters in a first parameter server in the first data server;
    wherein the model parameters are not stored at any one of the computing servers;

the distributed training method further comprises: downloading, by each of the data servers, training data and information of a model to be trained from a distributed file system, before the training is started;
wherein the distributed training method further comprises:
performing, by the task information server, a survival detection on each of the computing servers in the system, and if the number of available computing servers in the system remains unchanged, enabling the parameter server in each of the data servers to save the latest model parameters, and if the number of available computing servers in the system changes, updating a list of available computing server and enabling the parameter server in each of the data servers to reload the model parameters of the last survival detection;
suspending the training by the system, when the task information server performs the survival detection, and
sending a new training request to each of the data servers, according to current model parameters and identification information of recorded training data that has completed the training by the task information server, after the survival detection is completed.

2. The distributed training method according to claim 1, wherein there is no information interaction among the computing servers.

3. The distributed training method according to claim 1, wherein the task information server is a static node.

4. A non-transitory computer-readable storage medium which stores computer instructions, wherein the computer instructions enable a computer to perform the method according to claim 1.

5. An electronic device, comprising:
at least one processor; and
a memory communicatively connected to the at least one processor; wherein
the memory stores instructions executable by the at least one processor, and the instructions are executed by the at least one processor to enable the at least one processor to perform operations of:
sending, by the task information server, a first training request and information of an available first computing server to at least a first data server among a plurality of data servers;
sending, by the first data server, a first batch of training data to the first computing server, according to the first training request;
performing, by the first computing server, model training according to the first batch of training data, sending model parameters to the first data server so as to be stored as the trained model parameters after the training is completed, and sending identification information of the first batch of training data to the task information server so as to be recorded;
recording, by the task information server, a training progress, so as to configure training tasks to each of the computing servers in the system;
wherein each of the data servers comprises a parameter server; and
after the first computing server sends the trained model parameters to the first data server, the at least one processor is further enabled to perform an operation of: storing the trained model parameters in a first parameter server in the first data server;
wherein the model parameters are not stored at any one of the computing servers;
the at least one processor further is further enabled to perform an operation of:
downloading, by each of the data servers, training data and information of a model to be trained from a distributed file system, before the training is started;
wherein the at least one processor is further enabled to perform operations of:
performing, by the task information server, a survival detection on each of the computing servers in the system, and if the number of available computing servers in the system remains unchanged, enabling the parameter server in each of the data servers to save the latest model parameters, and if the number of available computing servers in the system changes, updating a list of available computing server and enabling the parameter server in each of the data servers to reload the model parameters of the last survival detection;
suspending the training by the system, when the task information server performs the survival detection, and
sending a new training request to each of the data servers, according to current model parameters and identification information of recorded training data that has completed the training by the task information server, after the survival detection is completed.

6. The electronic device according to claim 5, wherein there is no information interaction among the computing servers.

7. The electronic device according to claim 5, wherein the task information server is a static node.

* * * * *